FREDERICK VEAZIE, OF WORCESTER, MASSACHUSETTS.

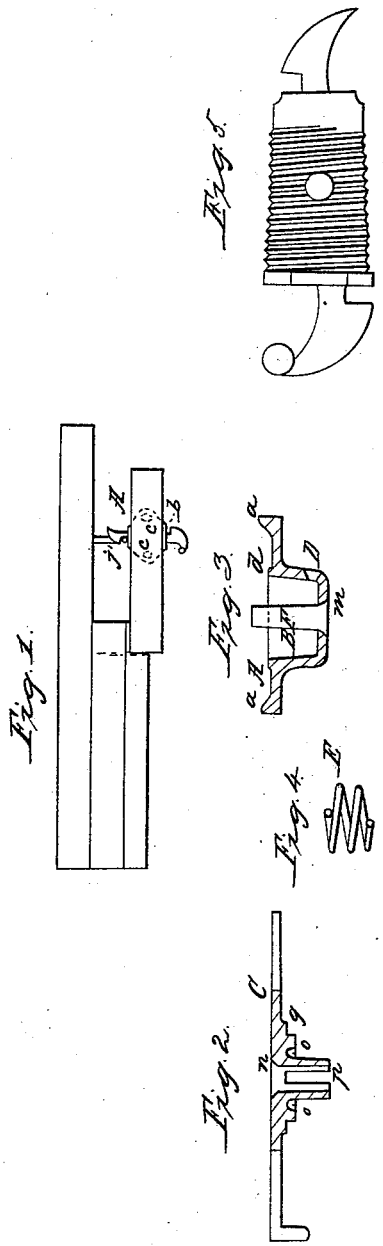

Letters Patent No. 84,661, dated December 1, 1868.

IMPROVEMENT IN BLIND-FASTENER.

The Schedule referred to in these Letters Patent and making part of the same.

*To all whom it may concern:*

Be it known that I, FREDERICK VEAZIE, of the city and county of Worcester, State of Massachusetts, have invented certain new and useful Improvements in the Construction of Blind-Fasteners; and I do hereby declare the following to be a full, clear, and exact description of the same, due reference being had to the accompanying drawings, making part of this specification, in which drawings—

Figure 1 is a view from above of an open blind, with my improved fastener attached.

Figures 2 and 3 are sections of the lever and stationary or bed-piece on a larger scale.

Figure 4 shows the spring.

Figure 5 is a view of my fastener, as adapted to insert through the rail or blind.

The same letters indicate the same parts where they occur in all the figures.

To enable others to make and use my invention, I proceed to describe its construction.

A is the stationary or bed-piece, made with chamber or cavity to receive and protect the spring from wet or paint, thereby preventing its destruction by rust, &c.

B is the cavity.

$a$ $a$ are stops for lever C, and they also strengthen the end of the bed-piece, which serves as a shield or stop, to prevent the wooden blind from striking the pin or hook, when from any cause the blind should be open or shut violently.

$b$, in fig. 1, is a notch, in which the pin $i$ or hook $j$ may fit, to prevent side motion, if the blind should be loose on its hinges, the bed-piece being made of sufficient length to accommodate any thickness of blind.

$c$ $c$ are screw-holes, for fastening the bed-piece to the blind, as shown in dotted lines.

At D is a small hole, to receive and hold one end of the spring E.

The raised place $d$ is a circular track or bearing of the bed-piece A for the lever C, whereby, in operation, no paint or other substance is liable to get in, to clog its movements, as no uncovered surface comes in contact with the bearing when the lever is moved in operation.

F, on the bed-piece, is a stem or rivet of itself, if desired, or may receive a rivet through it for holding the parts together, said rivet then moving at $n$ in lever C, or at $m$ in the bed-piece, or both.

The lever C is made either with a hollow stem to fit on the rivet, or stem in the bed-piece A, or with a solid stem of suitable material, said stem passing through the bed-piece, and being headed to hold the parts together.

At $g$, on the lever C, is a raised surface, or circular bearing and shoulder, which fits into and covers the bearing $d$ on the bed-piece, for the purpose aforesaid, both acting, as will be seen, as a stop to any water from running into the chamber from the lever C, to injure the spring E.

The shoulder of $g$, by passing up into the chamber B, has a bearing all round, thereby securing great strength to the fastener.

In the lever is a cavity for receiving the spring.

$p$ is a slot in the stem, when made hollow, for holding one end of the spring E, or, when made solid, only a wing or flange is needed for the same, or one end of the spring may be put through the lever E, to hold it, without departing from the principle of construction of my invention.

In fig. 5, the internal construction is the same, the shell or bed-piece being made in two halves of a taper cylinder, and provided with a screw on their outside, to hold it in place, the fastener being screwed in up to the collar $x$, the end acting as a shield, as described in the other form, the parts being held together by a suitable rivet.

Having thus fully described my invention,

What I claim therein as new, and desire to secure by Letters Patent, is—

The construction and arrangement of the blind-fastener, having the raised surface $d$, the shoulder $g$, and cavity B, to hold the spring E and notches and shoulders on the bed-piece, when constructed and operating in the manner and for the purposes above set forth and described.

FREDERICK VEAZIE.

Witnesses:
A. E. ACKLEY,
JAMES G. ARNOLD.